US009603070B2

(12) United States Patent
Jun et al.

(10) Patent No.: US 9,603,070 B2
(45) Date of Patent: *Mar. 21, 2017

(54) APPARATUS AND METHOD FOR MANAGING REQUESTS FOR SERVICE

(71) Applicant: AT&T MOBILITY II LLC, Atlanta, GA (US)

(72) Inventors: Jerry Jun, Austin, TX (US); Inderpreet Singh Ahluwalia, Austin, TX (US); Yunpeng Li, Austin, TX (US)

(73) Assignee: AT&T MOBILITY II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/743,252

(22) Filed: Jun. 18, 2015

(65) Prior Publication Data

US 2015/0289178 A1  Oct. 8, 2015

Related U.S. Application Data

(63) Continuation of application No. 13/692,000, filed on Dec. 3, 2012, now Pat. No. 9,088,586.

(51) Int. Cl.
H04L 1/00         (2006.01)
H04W 36/00        (2009.01)
H04L 29/06        (2006.01)
H04L 12/26        (2006.01)
H04W 88/06        (2009.01)

(52) U.S. Cl.
CPC ........ *H04W 36/0083* (2013.01); *H04L 43/10* (2013.01); *H04L 65/105* (2013.01); *H04L 65/1006* (2013.01); *H04L 65/1016* (2013.01); *H04L 65/1043* (2013.01); *H04L 65/1066* (2013.01); *H04L 65/1073* (2013.01); *H04W 88/06* (2013.01)

(58) Field of Classification Search
CPC .................................. H04W 36/0083
USPC ....................................... 370/250
See application file for complete search history.

(56) References Cited

U.S. PATENT DOCUMENTS

| 8,295,300 | B1 | 10/2012 | Chartier |
| 2003/0045289 | A1 | 3/2003 | Zhao et al. |
| 2003/0063564 | A1* | 4/2003 | Ha ............ H04L 12/5692 370/230 |
| 2007/0259673 | A1 | 11/2007 | Willars et al. |
| 2010/0080323 | A1 | 4/2010 | Mueck et al. |
| 2012/0014354 | A1 | 1/2012 | Dwyer et al. |
| 2012/0281561 | A1 | 11/2012 | Shukla et al. |
| 2012/0287920 | A1 | 11/2012 | Futaki et al. |

* cited by examiner

*Primary Examiner* — Shripal Khajuria
(74) *Attorney, Agent, or Firm* — Guntin & Gust, PLC; Ralph Trementozzi

(57) ABSTRACT

A system that incorporates the subject disclosure may include, for example, responsive to a determination that a first communication session is in a first state and a first sub-state, monitoring for an active timer associated with the first sub-state, where the first state and the first sub-state are defined by a communications protocol. The system can, responsive to a detection of the active timer, monitor for a packet switching service initiation request generated by the applications processor. The system can, responsive to detecting the packet switching service initiation request, temporarily prevent the packet switching service initiation request from being transmitted by the transceiver. Other embodiments are disclosed.

20 Claims, 6 Drawing Sheets

200

300

150
APPARATUS AND METHOD FOR MANAGING REQUESTS FOR SERVICE

CROSS-REFERENCE TO RELATED APPLICATION(S)

This application is a continuation of U.S. patent application Ser. No. 13/692,000 filed Dec. 3, 2012, which is incorporated herein by reference in its entirety.

FIELD OF THE DISCLOSURE

The subject disclosure relates to an apparatus and method for managing requests for service.

BACKGROUND

Communication devices can be used to provide services based on communication sessions established over a network. These communication sessions can be utilized for transmitting and receiving various data, including voice and video data. Communication devices are often capable of executing two or more applications at the same time.

The communication devices are often capable of operating according to various communication protocols. The protocols can establish procedures to be executed by the end user device, as well as by the network element(s), based on particular operating conditions.

BRIEF DESCRIPTION OF THE DRAWINGS

Reference will now be made to the accompanying drawings, which are not necessarily drawn to scale, and wherein.

DETAILED DESCRIPTION

Figure 1:
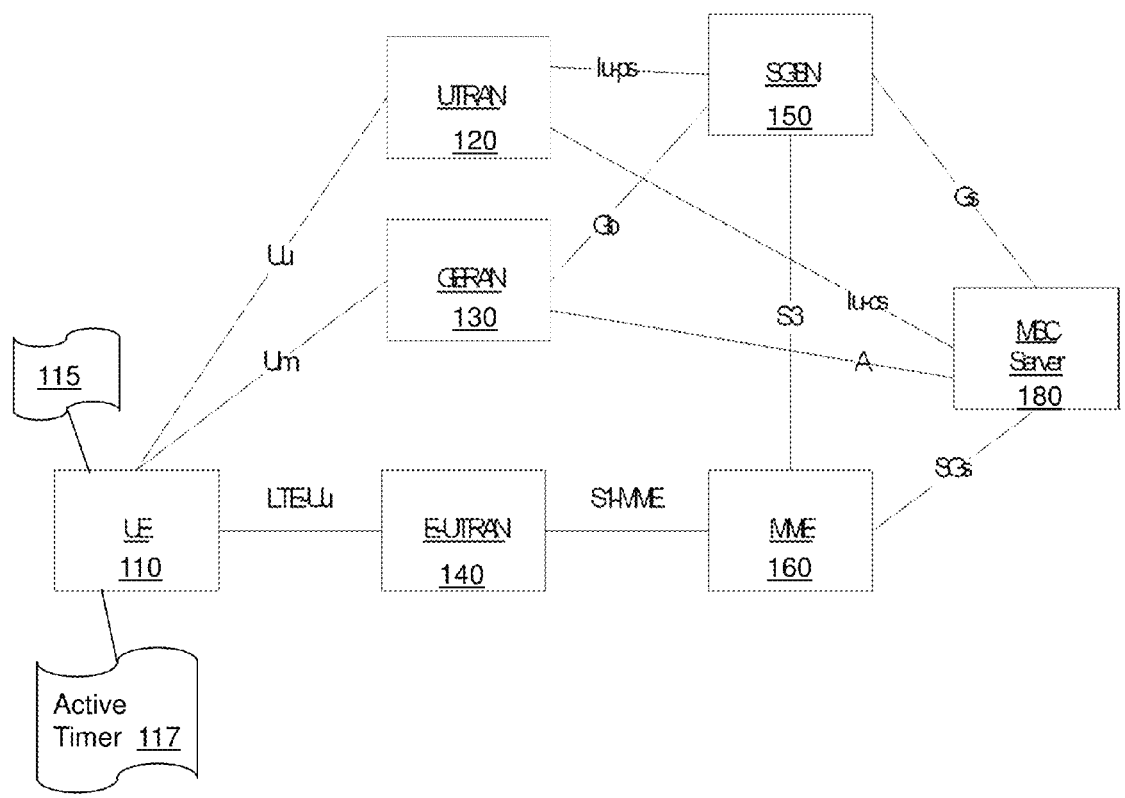
FIG. 1 depicts an illustrative embodiment of a communication system that provides communications services.

The subject disclosure describes, among other things, illustrative embodiments in which a user or host application at an end user device launches a new request for a packet-switching service while procedures and/or timers due to a previous session issue are still active at the end user device. In one or more embodiments, upon detecting a packet-switching service initiation request, the end user device processes the initiation request in a manner that allows selected currently running timers and/or selected procedures to be retained or otherwise completed by the end user device. For example, in one embodiment the initiation request does not alter procedures and/or timers while there is an active timer and the end user device is in one or more of the following states/sub-states (as described by the $3^{rd}$ Generation Partnership Project (3GPP) Specification): a mobility management (MM) idle state, an attempting-to-update sub-state of the MM idle state, a general packet radio service mobility management (GMM) deregistered state, an attempting-to-attach sub-state of the GMM deregistered state, a GMM registered state; an attempting-to-update state of the GMM deregistered sub-state, an evolved packet system mobility management (EMM) deregistered state, an attempting-to-attach state of the EMM deregistered state, an EMM registered state, an attempting-to-update state of the EMM registered state, and an E-UTRAN disabled state.

Other embodiments are included in the subject disclosure.

One embodiment of the subject disclosure includes a computer-readable storage device comprising computer instructions, which, responsive to being executed by a baseband processor of a wireless communication device, cause the baseband processor to perform operations including monitoring for a first communication session being in a first state defined by a wireless communications protocol. The computer instructions can enable, responsive to a determination that the first communication session is in the first state, monitoring for the first communication session being in a first sub-state defined by the wireless communications protocol. The computer instructions can enable, responsive to a determination that the first communication session is in the first sub-state, monitoring for an active timer associated with the first sub-state, wherein the active timer was commenced according to the wireless communications protocol. The computer instructions can enable, responsive to a detection of the active timer, monitoring for a packet switching service initiation request for a second communication session generated by an applications processor of the wireless communication device. The computer instructions can enable, responsive to a detection of the packet switching service initiation request, preventing the packet switching service initiation request from being transmitted during a duration of the active timer by a transceiver of the wireless communication device.

One embodiment of the subject disclosure includes monitoring, by a processor of a wireless communication device, for a first communication session being in a first state and a first sub-state where the first state and the first sub-state are defined by a communications protocol. The method can include responsive to a determination that the first communication session is in the first state and the first sub-state, monitoring, by the processor, for an active timer associated with the first sub-state. The method can include responsive to a detection of the active timer, monitoring, by the processor, for a packet switching service initiation request generated by the wireless communication device. The method can include responsive to a detection of the packet switching service initiation request, temporarily preventing, by the processor, the packet switching service initiation request from being transmitted by a transceiver of the wireless communication device.

One embodiment of the subject disclosure includes a wireless communication device including a memory to store instructions, an applications processor coupled to the memory, a transceiver, and a baseband processor coupled to the transceiver, the memory and the applications processor. The baseband processor, responsive to executing the instructions, performs operations including responsive to a determination that a first communication session is in a first state and a first sub-state, monitoring for an active timer associated with the first sub-state, wherein the first state and the first sub-state are defined by a communications protocol. The baseband processor can, responsive to a detection of the active timer, monitor for a packet switching service initiation request generated by the applications processor. The baseband processor can, responsive to a detection of the packet switching service initiation request, delay the packet switching service initiation request from being transmitted by the transceiver.

Referring to FIG. 1, a mobile communication system 100 is illustrated that can provide communication services, including voice, video and/or data services to mobile devices, such as end user device 110. System 100 can enable communication services over a number of different networks, such as between end user device 110 and another communication device (e.g., a second end user device) not shown. End user device 100 can be a number of different types of devices that are capable of voice, video and/or data communications, including a mobile device (e.g., a smartphone), a personal computer, a set top box, and so forth. End user device 100 can include computer instructions and/or hardware to perform service request and data transmission management functions 115. The management functions 115 can include monitoring for target states and sub-states for the end user device 110, and monitoring for an active timer 117 during the target states and sub-states. In one or more embodiments, the end user device 110 can operate according to a number of different states, as well as a number of different sub-states for each of the states. In one or more embodiments, some or all of the sub-states and/or states can implement one or more timers. During the timers, the end user device 110 or an application being executed therein can be limited in operation and upon expiration of the timer, the limit may be removed, such as sending and receiving data including service requests. For example, based on the monitoring and based on detection of the active timer 117, a packet switching service initiation request, such as generated by an applications processor of the end user device 110, can be prevented (temporarily or otherwise) from being transmitted by the end user device. In one or more embodiments, select active timer(s) may trigger the preventing of the transmission of the initiation requests while other active timer(s) may not be a triggering event.

The networks of the system 100 can include one or more of a Universal Terrestrial Radio Access Network (UTRAN) 120, a Global System for Mobile communications (GSM) Enhanced Data rates for GSM Evolution (EDGE) Radio Access Network 130 (herein referred to as GERAN 130), and an Evolved UTRAN (E-UTRAN) 140. The system 100 can further include one or more of a Serving General packet radio service (GPRS) Support Node (SGSN) 150, a Mobility Management Entity (MME) 160 and Mobile Switching Center (MSC) 180.

In one or more embodiments, system 100 can provide for circuit switching fallback for packet switching so as to enable the provisioning of voice and other circuit switching-domain services (e.g., circuit switching UDI video/LCS/USSD) by reuse of circuit switching infrastructure, such as when the end-user device 110 is served by E-UTRAN 140. In one or more embodiments, a circuit-switching fallback enabled terminal (e.g., end user device 110) connected to E-UTRAN 140 may use GERAN 130 or UTRAN 120 to connect to the circuit switching-domain. In one or more embodiments, the circuit switching fallback and Internet protocol Multimedia Subsystem (IMS)-based services of system 100 can co-exist in a single service operator's network.

In one or more embodiments, UTRAN 120 can include node B's and radio network controllers which enable carrying many traffic types including real-time circuit-switched to IP-based packet switched traffic. The UTRAN 120 can also enable connectivity between the end user device 110 and the core network. The UTRAN 120 can utilize a number of interfaces including Iu, Uu, Iub and/or Iur. For example, the Iu interface can be an external interface that connects the radio network controllers to the core network. The Uu can be an external interface that connects a node B with the end user device 110. The Iub can be an internal interface connecting the remote network controllers with the node B. The Iur interface can be an internal interface and/or external interface for connecting multiple remote network controllers.

In one or more embodiments, GERAN 130 can facilitate communications between base stations (e.g., Ater and Abis interfaces) and base station controllers (e.g., A interfaces).

In one or more embodiments, E-UTRAN 140 can be the air interface for the Long Term Evolution (LTE) upgrade path for mobile networks according to the 3GPP specification. E-UTRAN 140 can include enodeBs on the network that are connected to each other such as via an X2 interface, which are connectable to the packet switch core network via an S1 interface. For example, E-UTRAN 140 can use various communication techniques including orthogonal frequency-division multiplexing (OFDM), multiple-input multiple-output (MIMO) antenna technology depending on the capabilities of the terminal, and beamforming for downlink to support more users, higher data rates and lower processing power required on each handset.

In one or more embodiments, the SGSN 150 can assume responsibility for delivery of data packets from and to mobile stations within the SGSN's geographical service or coverage area. The SGSN 150 can perform functions including packet routing and transfer, mobility management (e.g., attach/detach and location management), logical link management, and/or authentication and charging functions. In one or more embodiments, a location register of the SGSN 150 can store location information (e.g., current cell) and user profiles (e.g., addresses used in the packet data network) of users registered with the SGSN.

In one or more embodiments, MME 160 can perform the function of a control-node. For example, the MME 160 can perform functions such as idle mode tracking and paging procedure including retransmissions. The MME 160 can also choose a serving gateway for the end user device 110 such as at the initial attach and at time of intra-LTE handover involving node relocation.

In one or more embodiments, the MSC 180 can perform functions including routing voice calls and Short-Message Service (SMS), as well as other services (e.g., conference calls, FAX and circuit switched data) via setting up and releasing end-to-end connections, handling mobility and hand-over requirements during the communications, and/or performing charging and real time pre-paid account monitoring.

Operational State of MM Idle

In one or more embodiments, the end user device 110 can enter the MM idle state and can further enter the attempting-to-update sub-state in which an active timer (e.g., T3212 as defined by the 3GPP Specification) is implemented. Management function 115 can enable detection of the MM idle state, the attempting-to-update sub-state, and the active timer 117. Based on the detection, the end user device 110 (e.g., based on software being executed at a baseband processor of the end user device) can prevent (e.g., temporarily or otherwise) a packet switching service initiation request or other data from being transmitted, such as where another application being executed by the end user device 110 generates the request or other data. In one or more embodiments, procedures associated with the detected active timer can be permitted to continue to be executed despite the generation of other service initiation requests during the duration of the active timer.

In one or more embodiments, the end user device 110 can enter the MM idle state in which there is no MM procedure running and no Radio Resource (RR) connection (e.g., a dedicated physical circuit switched domain connection used by the two RR or RRC peer entities to support the upper layers' exchange of information flows) exists except that a local MM context may exist such as when an RR sublayer is in a group receive mode. The MM idle state in which end user device 110 can operate includes several sub-states which can depend on a number of factors including the update status. For example, the end user device 110 can operate in a normal service sub-state where valid subscriber data is available, update status is U1 (e.g., indicating that the last location updating attempt was successful), and a cell is selected that belongs to the Location Area (LA) where the subscriber is registered. The end user device 110 can also enter an attempting-to-update sub-state in which valid subscriber data is available, update status is U2 (e.g., indicating a procedural failure in the last updating attempt) and a cell is selected. In one or more embodiments of the attempting-to-update sub-state, requests from upper layers can be accepted and emergency call requests can be treated normally, otherwise the request triggers first a location updating attempt in the selected cell, and then triggers the needed procedure only in case of successful location updating, otherwise the request is rejected.

During the attempting-to-update sub-state for the MM idle state, the end user device 110 can perform a number of functions including one or more of: performing location updating procedure at expiry of select timers (e.g., timers T3211, T3213 or T3246 as defined in the 3GPP Specification); performing normal location updating when the location area identification of the serving cell changes, if timer T3246 is not running; in some instances, performing location updating when a new cell is entered; in some instances, location updating may not be performed because a new cell is entered; performing normal location updating at expiry of timer T3212; not performing IMSI detach; supporting request for emergency calls; using other requests from CM layer as triggering of normal location updating procedure if the location updating is successful, then the requesting for MM connection can be accepted, if timer T3246 is not running; responding to paging (with IMSI); and for an eCall only mobile station (as determined by information configured in USIM), performing the eCall inactivity procedure at expiry of timer T3242 or timer T3243.

Additional functions that can be performed in the attempting-to-update sub-state for the MM idle state can include the end user device 110 supporting VGCS listening or VBS listening indicating notifications to the GCC or BCC sublayer for which a channel description has been received in the notification by the RR sublayer; rejecting requests of the GCC or BCC sublayer to respond to notifications for which no channel description has been received in the notification by the RR sublayer; and requesting the RR sublayer to receive a voice group or broadcast call if the GCC or BCC sublayer requests the reception of a voice group or broadcast call for which a channel description has been received in the notification by the RR sublayer and then go to the service state RECEIVING GROUP CALL (LIMITED SERVICE).

In one or more embodiments, the MM idle state and/or its corresponding attempting-to-update sub-state can be ended when an emergency services or test/reconfiguration call is initiated by the end user device 110, where the new state can depend on the result of the procedure when returning to the MM idle state.

In one or more embodiments, the end user device 110 can perform periodic updating to notify periodically the availability of the end user device to the network. This procedure can be controlled by a timer T3212 in the end user device 110. For example, the end user device 110 can indicate in the MS network feature support IE whether it supports the extended value for timer T3212. If the end user device 110 receives a Per MS T3212 IE in a Location Updating Accept message, the end user device can use this IE to determine the value of T3212 instead of the value of T3212 that is broadcast. If the end user device 110 does not receive the Per MS T3212 IE in the Location Updating Accept message, the end user device can use the value of T3212 that is broadcast. If this timer is not already started, the timer can be started each time the end user device 110 enters the normal service sub-state or the attempting-to-update sub-state of the MM idle. When the end user device 110 leaves the MM idle state, the timer T3212 can continue running until explicitly stopped.

In one or more embodiments, when the timer T3212 expires, a location updating procedure can be started and the timer can be set to its initial value for the next start. If the end user device 110 is in a state other than MM idle when the timer expires then the location updating procedure can be delayed until the MM idle state is entered. In one or more embodiments, at a transition to the normal service or attempting to update sub-state of the MM idle state, either the timer T3212 or timer T3211 can be started.

In one or more embodiments, the end user device 110 can be operating in an abnormal condition. For instance, if the detach type information element value indicates "GPRS detach without switching off" and the end user device 110 is attached for GPRS and non-GPRS services and the network operates in network operation mode I, then if the timer T3212 (active in the end user device) is not already running, the timer T3212 can be set to its initial value and restarted after a DETACH REQUEST message has been sent.

In one or more embodiments, the T3212 timer that executes in the MM idle state can be caused by a termination of MM service or by MM signaling where the timer can be stopped due to an initiation of MM service or by MM signaling. In this embodiment, at the expiration of the T3212 timer, initiation of periodic updating can be performed.

In one or more embodiments, to limit the number of subsequently rejected routing area update attempts during the MM idle state, a routing area updating attempt counter can be introduced. The routing area updating attempt counter can be reset when one or more of the following occur: a GPRS attach procedure is successfully completed; a routing area updating procedure is successfully completed; a combined routing area updating procedure is completed for GPRS services; and a routing area updating procedure is rejected. In one or more embodiments, the counter can be reset when the ends user device 110 is in the attempting-to-update sub-state and a new routing area is entered or expiry of timer T3302 or at request from registration function or a timer T3346 is started.

In one or more embodiments, a normal routing area updating procedure can be initiated upon reception of a paging indication, using P-TMSI, if the timer T3346 is running and the end user device 110 is in the attempting-to-update sub-state of the GMM registered state.

In one or more embodiments, if the routing area updating cannot be accepted, the network can send a ROUTING AREA UPDATE REJECT message to the end user device 110. An end user device 110 that receives a ROUTING AREA UPDATE REJECT message, can stop timer T3330, and can selectively delete the list of equivalent PLMNs (some causes of the message such as congestion may not trigger the deletion). If a ROUTING AREA UPDATE REJECT message is received, the end user device 110 can stop any ongoing transmission of user data. If the routing area update request is rejected due to general NAS level mobility management congestion control, the network can set the GMM cause value to "congestion" and can assign a back-off timer T3346. The end user device 110 can take different actions depending on the received reject cause value. As an example, for a "congestion" value, if the T3346 value IE is present in the ROUTING AREA UPDATE REJECT message and the value indicates that this timer is neither zero nor deactivated, the end user device 110 can abort the routing area updating procedure, reset the routing area updating attempt counter and set the GPRS update status to GU2 NOT UPDATED. If the rejected request was not for initiating a PDN connection for emergency bearer services, the end user device 110 can change to the attempting-to-update sub-state of the GMM registered state. The end user device 110 can stop the timer T3346 if it is running and if the ROUTING AREA UPDATE REJECT message is integrity protected, the end user device 110 can start the timer T3346 with the value provided in the T3346 value IE. If the ROUTING AREA UPDATE REJECT message is not integrity protected, the end user device 110 can start timer T3346 with a random value from a default range. In one embodiment, the end user device 110 can stay in the current serving cell and can apply the normal cell reselection process. The routing area updating procedure can be started, if still necessary, when timer T3346 expires or is stopped. If the update type is "periodic updating", a GPRS end user device operating in operation mode A or B in network operation mode I can still be IMSI attached for CS services in the network.

In one or more embodiments, the end user device 110 can operate in an abnormal operation for an "Extended wait time" for PS domain from the lower layers. If the ROUTING AREA UPDATE REQUEST message contains the low priority indicator set to "MS is configured for NAS signaling low priority", the end user device can start timer T3346 with the "Extended wait time" value. In other cases, the end user device 110 can ignore the "Extended wait time." The end user device can abort the routing area updating procedure, reset the routing area updating attempt counter, stay in the current serving cell, set the GPRS update status to GU2 NOT UPDATED, change the state to the attempting-to-update sub-state of the GMM deregistered state and apply the normal cell reselection process.

In one or more embodiments, if a stored Routing Area Identification (RAI) is different to the RAI of the current serving cell or the TIN indicates "GUTI", the end user device 110 can set the GPRS update status to GU2 NOT UPDATED and change to the attempting-to-update sub-state of the GMM registered state.

In one or more embodiments, if the routing area updating attempt counter is less than 5, and the stored RAI is different from the RAI of the current serving cell or the GPRS update status is different from GU1 UPDATED or the TIN indicates "GUTI" then: the end user device 110 can start timer T3311, can set the GPRS update status to GU2 NOT UPDATED and can change to the attempting-to-update state of the GMM registered state. In one or more embodiments, if the routing area updating attempt counter is greater than or equal to 5 then the end user device 110 can start the timer T3302, can delete the list of equivalent PLMNs, can set the GPRS update status to GU2 NOT UPDATED and can change to the attempting-to-update sub-state of the GMM registered state.

Operational State of GMM Deregistered

In one or more embodiments, the end user device 110 can enter the GMM deregistered state and can further enter the attempting-to-attach sub-state in which an active timer (e.g., T3302 as defined by the 3GPP Specification) is implemented. Management function 115 can enable detection of the GMM deregistered state, the attempting-to-attach sub-state, and the active timer 117. Based on the detection, the end user device 115 (e.g., based on software being executed at a baseband processor of the end user device) can prevent (e.g., temporarily) a packet switching service initiation request from being transmitted, such as where another application being executed by the end user device 110 generates the request. In one or more embodiments, procedures associated with the detected active timer can be permitted to continue to be executed despite the generation of other service initiation requests during the duration of the active timer.

In one or more embodiments, the end user device 110 can enter the GMM deregistered state such as when the end user device is switched on; the GPRS capability has been enabled in the end user device; a GPRS detach or combined GPRS detach procedure has been performed; or a GMM procedure has failed (except routing area updating. Transitioning by the end user device 110 between various sub-states of the GMM deregistered sub-state can be caused by a number of triggering events such as insertion or removal of the SIM/USIM; cell selection/reselection; PLMN search; loss/regain of coverage; or change of RA.

During the normal service sub-state of the GMM deregistered sub-state, the end user device 110 can initiate the GPRS attach. During the attempting-to-attach sub-state of the GMM deregistered state, the GPRS update status can be GU2, a cell can be selected, and a previous GPRS attach may have been rejected. The execution of further attach procedures can depend on the GPRS attach attempt counter. In one embodiment, no GMM procedure except GPRS attach is initiated by the end user device 110 in this sub-state. For example, the end user device 110 can perform a number of functions during this sub-state including one or more of: initiate the GPRS attach on the expiry of timers T3311, T3302, or T3346 (as defined by the 3GPP Specification); initiate GPRS attach when entering a new PLMN not in the list of equivalent PLMNs, if the PLMN identity of the new cell is not in one of the forbidden PLMN lists and the location area this cell is belonging to is not in one of the lists of forbidden LAs; initiate GPRS attach for emergency bearer services (UTRAN Iu mode only) even if timer T3346 is running; initiate GPRS attach when the routing area of the serving cell in the current PLMN or equivalent PLMN has changed, if timer T3346 is not running and the location area this cell is belonging to is not in one of the lists of forbidden LAs; in some instances perform GPRS attach when a new cell is entered; in some instances do not perform GPRS attach when a new cell is entered; use requests from CM layers to trigger the combined GPRS attach procedure, if timer T3346 is not running and the network operates in network operation mode I. Depending on which of the timers T3311 or T3302 is running, the end user device 110 can stop the relevant timer and act as if the stopped timer has expired; and can initiate GPRS attach upon request of the upper layers to establish a PDN connection for emergency bearer.

In one or more embodiments, when returning to the GMM deregistered state, the end user device 110 can select a cell. The sub-state entered into by the end user device 110 can depend on the result of the cell selection procedure, the outcome of the previously performed GMM specific procedures, on the GPRS update status of the MS, on the location area data stored in the MS and on the presence of the SIM/USIM: f no cell has been found, the sub-state can be NO-CELL-AVAILABLE, until a cell is found; if no SIM/USIM is present or if the inserted SIM/USIM is considered invalid by the MS, the sub-state can be NO-IMSI; if a suitable cell supporting GPRS has been found and the PLMN or LA is not in the forbidden list, the sub-state can be normal service; and if a GPRS attach is to be performed (e.g. network requested reattach), the sub-state can be attempting-to-attach.

To limit the number of subsequently rejected attach attempts, a GPRS attach attempt counter can be utilized by the end user device 110. Depending on the value of the GPRS attach attempt counter, specific actions can be performed, where the GPRS attach attempt counter can be reset when: the end user device 110 is powered on; a SIM/USIM is inserted; a GPRS attach procedure is successfully completed; an attach or combined attach procedure is successfully completed in S1 mode; a combined GPRS attach procedure is completed for GPRS services; a GPRS attach procedure is completed; a network initiated detach procedure is completed; and when the end user device 110 is in the attempting-to-attach sub-state: expiry of timer T3302, a new routing area is entered, an attach is triggered by CM sublayer requests, or a timer T3346 is started.

In one or more embodiments, the GPRS attach may not be accepted by the network. If the attach request is not accepted by the network, an ATTACH REJECT message can be transferred to the end user device 110. The end user device 110 receiving the ATTACH REJECT message, can stop timer T3310 and can selectively (e.g., except if congestion is being experienced) delete the list of equivalent PLMNs. If the attach request is rejected due to NAS level mobility management congestion control, the network can set the GMM cause value to "congestion" and assign a back-off timer T3346. The end user device 110 can, in the event of congestion, take the following action: if the T3346 value IE is present in the ATTACH REJECT message and the value indicates that this timer is neither zero nor deactivated, the end user device can proceed as described below, otherwise it can be considered as an abnormal case. In one or more embodiments, the end user device 110 can abort the attach procedure, reset the attach attempt counter, set the GPRS update status to GU2 NOT UPDATED and enter the attempting-to-attach sub-state of the GMM deregistered state. In one or more embodiments, the end user device 110 can stop timer T3346 if it is running and if the ATTACH REJECT message is integrity protected, the end user device can start timer T3346 with the value provided in the T3346 value IE. If the ATTACH REJECT message is not integrity protected, the end user device 110 can start timer T3346 with a random value from a default range. The end user device 110 can stay in the current serving cell and can apply a normal cell reselection process. The attach procedure can be started if still needed when timer T3346 expires or is stopped.

In one or more embodiments, the end user device 110 can operate in an abnormal condition such as an "Extended wait time" for PS domain from the lower layers. If the ATTACH REQUEST message contains the low priority indicator set to "MS is configured for NAS signaling low priority", the end user can start timer T3346 with the "Extended wait time" value. In other cases, the end user device 110 can ignore the "Extended wait time". In one or more embodiments, the end user device 110 can abort the attach procedure, reset the attach attempt counter, stay in the current serving cell, change to the attempting-to-attach cub-state and apply the normal cell reselection process. The GPRS attach procedure can be started, if still necessary, when timer T3346 expires or is stopped.

In one or more embodiments, if the GPRS attach attempt counter is less than 5: the timer T3311 can be started and the state changed to attempting-to-attach sub-state. If the GPRS attach attempt counter is greater than or equal to 5: the end user device 110 can delete any RAI, P-TMSI, P-TMSI signature, list of equivalent PLMNs, and GPRS ciphering key sequence number; can set the GPRS update status to GU2 NOT UPDATED, and can start timer T3302. The state can be changed to attempting-to-attach or can be changed to PLMN-search in order to perform a PLMN selection. In one embodiment, if S1 mode is supported by the end user device 110, the end user device can process the EMM parameters EMM state, EPS update status, GUTI, last visited registered TAI, TAI list and KSI for the abnormal case when a normal attach procedure fails and the attach attempt counter is equal to 5.

In one or more embodiments, the timer T3302 can be set to a default value of twelve minutes and can be started as a result of an attach failure and the attempt counter is greater than or equal to 5 or as a result of a routing area updating failure and the attempt counter is greater than or equal to 5. In this embodiment, the timer 3302 can normally be stopped by either a GPRS or a RAU procedure being initiated. In this embodiment, on expiration of the T3302 timer, the GPRS attach procedure or the RAU procedure can be initiated.

Operational State of GMM Registered

In one or more embodiments, the end user device 110 can enter the GMM registered state and can further enter the attempting-to-update sub-state in which an active timer (e.g., T3302 as defined by the 3GPP Specification) is implemented. Management function 115 can enable detection of the GMM registered state, the attempting-to-update sub-state, and the active timer 117. Based on the detection, the end user device 115 (e.g., based on software being executed at a baseband processor of the end user device) can prevent (e.g., temporarily) a packet switching service initiation request from being transmitted, such as where another application being executed by the end user device 110 generates the request. In one or more embodiments, procedures associated with the detected active timer can be permitted to continue to be executed despite the generation of other service initiation requests during the duration of the active timer.

In one or more embodiments, the end user device 110 can enter a GMM registered state where in a normal services state, the end user device can perform cell selection/reselection, initiate normal routing area updating, perform periodic routing area updating except when attached for emergency bearer services and receive and transmit user data and signaling information. The end user device 110 can also enter into an attempting-to-update sub-state of the GMM registered state. During this sub-state, a routing area updating procedure performed by the end user device 110 may have failed due to a missing response from the network. The end user device 110 can retry the procedure controlled by timers and a GPRS attempt counter. In one embodiment, no GMM procedure except routing area updating is initiated by the end user device. This sub-state can also provide that no data is to be sent or received.

During the attempting-to-update sub-state of the GMM registered state, the end user device 110 may not send any user data; may not initiate routing area updating procedure on the expiry of timers T3311, T3302 or T3346 (as defined by the 3GPP Specification); may initiate routing area updating procedure when entering a new PLMN not in the list of equivalent PLMNs, if the PLMN identity of the new cell is not in one of the forbidden PLMN lists and the location area this cell is belonging to is not in one of the lists of forbidden LAs; may initiate routing area updating procedure when the routing area of the serving cell in the current PLMN or equivalent PLMN has changed, if timer T3346 is not running and the location area this cell is belonging to is not in one of the lists of forbidden LAs; may, in some instances, initiate routing area updating procedure when a new cell is entered; may, in some instances, not initiate routing area updating procedure when a new cell is entered; may use requests from CM layers to trigger the combined routing area updating procedure, if timer T3346 is not running and the network operates in network operation mode I. Depending on which, if any, of the timers T3311 or T3302 is running, the end user device 110 may stop the relevant timer and act as if the stopped timer has expired; may initiate routing area updating procedure upon request of the upper layers to establish a PDN connection for emergency bearer services (UTRAN Iu mode only); and may initiate routing area updating procedure in response to paging, if timer T3346 is running.

Operational State of EMM Deregistered

In one or more embodiments, the end user device 110 can enter the EMM deregistered state and can further enter the attempting-to-attach sub-state in which an active timer (e.g., T3402 as defined by the 3GPP Specification) is implemented. Management function 115 can enable detection of the EMM deregistered state, the attempting-to-attach sub-state, and the active timer 117. Based on the detection, the end user device 115 (e.g., based on software being executed at a baseband processor of the end user device) can prevent (e.g., temporarily) a packet switching service initiation request from being transmitted, such as where another application being executed by the end user device 110 generates the request. In one or more embodiments, procedures associated with the detected active timer can be permitted to continue to be executed despite the generation of other service initiation requests during the duration of the active timer.

In one or more embodiments, the end user device 110 can enter into an EMM deregistered state where in a normal service sub-state, the end user device 110 can initiate an attach or combined attach procedure. For example, in this state, the MME can have no EMM context or the EMM Context is marked as detached, such as where the end user device 110 is detached. In one or more embodiments, the MME may answer to the attach or a combined attach procedure initiated by the end user device 110. The MME may also answer to a tracking area updating procedure or combined tracking area updating procedure initiated by an end user device 110 if the EMM context is marked as detached. The MME may also answer to a detach procedure initiated by the end user device 110.

In one or more embodiments, the attempting-to-attach sub-state of the EMM deregistered state can be chosen in the end user device 110, if the EPS update status is EU2, and a previous attach was not successful. In this sub-state, the end user device 110 can initiate an attach or combined attach procedure on the expiry of active timers, such as T3411, T3402 or T3346 defined in the 3GPP specification; can initiate an attach for emergency bearer services even if timer T3346 is running; can initiate an attach or combined attach procedure when entering a new PLMN not in the list of equivalent PLMNs, if the PLMN identity of the new cell is not in one of the forbidden PLMN lists and the tracking area is not in one of the lists of forbidden tracking areas; can initiate an attach or combined attach procedure when the tracking area of the serving cell in the current PLMN or equivalent PLMN has changed, if timer T3346 is not running and the tracking area of the new cell is not in one of the lists of forbidden tracking areas; and can initiate an attach procedure upon request of the upper layers to establish a PDN connection for emergency bearer services.

In one or more embodiments, the end user device 110 when returning to the EMM deregistered state from another state, the end user device can select a cell. The sub-state that is entered for the EMM deregistered state can depend on the result of the cell selection procedure, the outcome of the previously performed EMM specific procedures, on the EPS update status of the UE, on the tracking area data stored in the UE and/or on the presence of the USIM. For example, if no cell has been found, the sub-state can be NO-CELL-AVAILABLE until a cell is found; if no USIM is present or if the inserted USIM is considered invalid by the UE, then the sub-state can be NO-IMSI; if a suitable cell has been found and the PLMN or tracking area is not in the forbidden list, the sub-state can be normal service; if an attach is to be performed (e.g. network requested re-attach), the sub-state can be attempting-to-attach; if a PLMN reselection is needed, then the sub-state can be PLMN-SEARCH; if the selected cell is known not to be able to provide normal service, the sub-state can be limited service; and if the selected cell is a non-3GPP cell, then the sub-state can be no-cell-available.

In one or more embodiments, an attach attempt counter can be used to limit the number of subsequently rejected attach attempts. Depending on the value of the attach attempt counter, specific actions can be performed. For example, the attach attempt counter can be reset when: the end user device 110 is powered on; a USIM is inserted; an attach or combined attach procedure is successfully completed; a GPRS attach or combined GPRS attach procedure is successfully completed in A/Gb or Iu mode; a combined attach procedure is completed for EPS services; an attach or combined attach procedure is rejected; or a network initiated detach procedure is completed with cause. Additionally the attach attempt counter can be reset when the end user device 110 is in the sub-state attempting-to-attach and one of: a new tracking area is entered; timer T3402 expires; or a timer T3346 is started.

In one or more embodiments, an attach may not be accepted by the network. For example, if the attach request cannot be accepted by the network, the MME can send an ATTACH REJECT message to the end user device 110 including an appropriate EMM cause value. In one example, if the attach procedure fails due to a default EPS bearer setup failure, an ESM procedure failure, or operator determined barring is applied on default EPS bearer context activation during an attach procedure, the MME can combine the ATTACH REJECT message with a PDN CONNECTIVITY REJECT message contained in the ESM message container information element. In this example, the EMM cause value in the ATTACH REJECT message can be set to "ESM failure". If the attach request is rejected due to NAS level mobility management congestion control, the network can set the EMM cause value to "congestion" and assign a back-off timer T3346.

In one embodiment, if the T3346 value IE is present in the ATTACH REJECT message and the value indicates that this timer is neither zero nor deactivated, the end user device 110 can perform a number of functions including aborting the attach procedure, resetting the attach attempt counter, setting the EPS update status to EU2 NOT UPDATED, and entering the attempting-to-attach sub-state. As an example, the end user device can stop timer T3346 if it is running and if the ATTACH REJECT message is integrity protected, the end user device 110 can start timer T3346 with the value provided in the T3346 value IE. If the ATTACH REJECT message is not integrity protected, the end user device 110 can start timer T3346 with a random value from a default range. The end user device 110 can stay in the current serving cell and can apply the normal cell reselection process. The attach procedure can be started if still needed when timer T3346 expires or is stopped.

In one or more embodiments, if the attach attempt counter is less than 5: for the cases l and m, the attach procedure can be started, if still necessary, when timer T3346 expires or is stopped; for all other cases, timer T3411 can be started and the state changed to the attempting-to-attach sub-state. When timer T3411 expires, the attach procedure can be restarted, if still required by ESM sublayer. In another embodiment, if the attach attempt counter is equal to 5: the end user device 110 can delete any GUTI, TAI list, last visited registered TAI, list of equivalent PLMNs and KSI, can set the update status to EU2 NOT UPDATED, and can start timer T3402. The state can be changed to attempting-to-attach or to PLMN-search in order to perform a PLMN selection. In one embodiment, if A/Gb mode or Iu mode is supported by the end user device 110, the end user device can in addition handle the GMM parameters GMM state, GPRS update status, P-TMSI, P-TMSI signature, RAI and GPRS ciphering key sequence number for an abnormal case when a normal attach procedure fails and the attach attempt counter is equal to 5.

In one or more embodiments, the end user device 110 can operate in an abnormal case such as a transmission failure of DETACH ACCEPT message indication from lower layers. In this example or other abnormal cases, the end user device 110 can delete any GUTI, TAI list, last visited registered TAI, list of equivalent PLMNs, KSI, can set the update status to EU2 NOT UPDATED and can start timer T3402. The end user device 110 can enter a PLMN-search sub-state in order to perform a PLMN selection otherwise the end user device can enter the attempting-to-attach sub-state.

In one embodiment, the T3402 timer can be set to a default of twelve minutes and can be caused by an attach failure and the attempt counter is equal to 5 or a tracking area updating failure and the attempt counter is equal to 5. The T3402 timer can stop responsive to an ATTACH REQUEST being sent or a TRACKING AREA UPDATE REQUEST being sent. In this example, at the expiration of the T3402 timer, there can be an initiation of the attach procedure if still required or performance of a TAU procedure.

Operational State of EMM Registered

In one or more embodiments, the end user device 110 can enter the EMM registered state and can further enter the attempting-to-update sub-state in which an active timer (e.g., T3402 as defined by the 3GPP Specification) is implemented. Management function 115 can enable detection of the EMM idle state, the attempting-to-update sub-state, and the active timer 117. Based on the detection, the end user device 115 (e.g., based on software being executed at a baseband processor of the end user device) can prevent (e.g., temporarily) a packet switching service initiation request from being transmitted, such as where another application being executed by the end user device 110 generates the request. In one or more embodiments, procedures associated with the detected active timer can be permitted to continue to be executed despite the generation of other service initiation requests during the duration of the active timer.

In one or more embodiments, the end user device 110 can enter the EMM registered state when the attach or combined attach procedure is performed by the end user device. During a normal service sub-state, the end user device 110 can initiate normal and combined tracking area updating; can perform periodic tracking area updating except when attached for emergency bearer services; and can respond to paging. For example, the end user device 110 can initiate a tracking area updating procedure by sending a TRACKING AREA UPDATE REQUEST message to the MME, upon reception of a paging indication using S-TMSI, if the timer T3346 is running and the end user is in the attempting-to-update sub-state.

The attempting-to-update sub-state can be entered by the end user device 110 if the tracking area updating or combined tracking area updating procedure failed due to a missing response from the network. In this embodiment during this sub-state, no EMM procedure except the tracking area updating or combined tracking area updating procedure is to be initiated by the end user device 110 and no data shall be sent or received.

During the attempting-to-update sub-state, the end user device 110 may not send any user data; can initiate tracking area updating on the expiry of timers such as T3411, T3402 or T3346 defined by the 3GPP Specification; can initiate tracking area updating when entering a new PLMN not in the list of equivalent PLMNs, if the PLMN identity of the new cell is not in one of the forbidden PLMN lists, and the tracking area is not in one of the lists of forbidden tracking areas; can initiate tracking area updating when the tracking area of the serving cell in the current PLMN or equivalent PLMN has changed, if timer T3346 is not running and this tracking area is not in one of the lists of forbidden tracking areas; can initiate a tracking area updating procedure upon request of the upper layers to establish a PDN connection for emergency bearer services; and can initiate tracking area updating in response to paging, if timer T3346 is running.

In one or more embodiments, the normal and periodic tracking area updating procedure may not be accepted by the network. If the tracking area updating cannot be accepted by the network, the MME can send a TRACKING AREA UPDATE REJECT message to the end user device 110 including an appropriate EMM cause value. If the MME locally deactivates EPS bearer contexts for the end user device and no active EPS bearer contexts remain for the end user device, the MME can send the TRACKING AREA UPDATE REJECT message including the EMM cause value "Implicitly detached". If the tracking area update request is rejected due to general NAS level mobility management congestion control, the network can set the EMM cause value to "congestion" and assign a back-off timer T3346. In one embodiment, upon receiving the TRACKING AREA UPDATE REJECT message, the end user device 110 can stop timer T3430, can stop any transmission of user data, and can take a number of actions depending on the EMM cause value received.

As an example, if the EMM cause value received is congestion, the end user device 110 can perform a number of functions if the T3346 value IE is present in the TRACK-ING AREA UPDATE REJECT message and the value indicates that this timer is neither zero nor deactivated, proceed as described below, otherwise it can be considered as an abnormal case. The number of functions performed can include the end user device 110 aborting the tracking area updating procedure, resetting the tracking area updating attempt counter and setting the EPS update status to EU2 NOT UPDATED. If the rejected request was not for initiating a PDN connection for emergency bearer services, the end user device can change to the attempting-to-update sub-state. As an example, of an abnormal case, an "Extended wait time" from the lower layers can be identified. In this abnormal case, if the TRACKING AREA UPDATE REQUEST message contained the low priority indicator set to "MS is configured for NAS signaling low priority", the end user device can start timer T3346 with the "Extended wait time" value. In one or more embodiments in some instances, the end user device 110 can abort the tracking area updating procedure, reset the tracking area updating attempt counter, stay in the current serving cell, set the EPS update status to EU2 NOT UPDATED, change the state to attempting-to-update and apply the normal cell reselection process.

In one embodiment, if the TAI of the current serving cell is not included in the TAI list or the TIN indicates "P-TMSI", the end user device 110 can set the EPS update status to EU2 NOT UPDATED and change to the sub-state of attempting-to-update.

In one or more embodiments, if a tracking area updating attempt counter being implemented at the end user device 110 is less than 5, and the TAI of the current serving cell is not included in the TAI list or the EPS update status is different to EU1 UPDATED or the TIN indicates "P-TMSI": for the cases k and l, the tracking area updating procedure can be started if still necessary when timer T3346 expires or is stopped; for all other cases, the end user device 110 can start timer T3411, can set the EPS update status to EU2 NOT UPDATED and can change to the sub-state of attempting-to-update. When timer T3411 expires the tracking area updating procedure can be triggered again. In this embodiment, if the tracking area updating attempt counter is equal to 5: the end user device 110 can start timer T3402, can set the EPS update status to EU2 NOT UPDATED, can delete the list of equivalent PLMNs and can change to state attempting-to-update or optionally to PLMN-search in order to perform a PLMN selection.

Operational State of E-UTRAN Disabled

In one or more embodiments, the end user device 110 can disable E-UTRAN capabilities in which an active timer (e.g., T3212 as defined by the 3GPP Specification) is implemented. Management function 115 can enable detection of the E-UTRAN disablement and the active timer 117. Based on the detection, the end user device 115 (e.g., based on software being executed at a baseband processor of the end user device) can prevent (e.g., temporarily) a packet switching service initiation request from being transmitted, such as where another application being executed by the end user device 110 generates the request. In one or more embodiments, procedures associated with the detected active timer can be permitted to continue to be executed despite the generation of other service initiation requests during the duration of the active timer.

In one or more embodiments, the end user device 110 can disable the E-UTRAN capabilities and can implement procedure(s) and/or timer(s) responsive to the disabling. For example, if a request from upper layers to establish a CS emergency call is received and the end user device 110 is unable to perform CS fallback, the end user device can attempt to select GERAN or UTRAN radio access technology, and an end user device with "IMS voice not available" can disable the E-UTRA capability to allow a potential callback, and then progress the CS emergency call establishment.

Usage setting changes for the end user device 110 can result in changing the E-UTRAN capabilities of the end user device. For instance, responsive to the end user device 110 changing from data centric to voice centric and "IMS voice not available", the end user device can disable E-UTRAN capabilities if voice domain selection results in a selection to a different RAT, or combined tracking area update with IMSI attach if voice domain selection results in attempt to stay in E-UTRAN. If the end user device 110 changes from voice centric to data centric and E-UTRAN is already disabled, then the end user device can re-enable E-UTRAN capabilities.

The E-UTRAN capabilities can be disabled by the end user device 110 in other circumstances, such as usage settings changing from data centric to voice centric, CS fallback is not available and "IMS voice not available"; or usage settings changing from data centric to voice centric, "IMS voice not available" and the end user device received a "CS fallback not preferred" or "SMS only" indication during the last successful combined attach or combined tracking area updating procedure, and the end user device 110 is configured to use CS fallback; the end user device is not available for voice calls in the IMS indication from upper layers, SMS configuration is set to prefer to use SMS over IP networks, and voice domain preference for E-UTRAN is "IMS PS voice only"; or the end user device is not available for voice calls in the IMS indication from upper layers, SMS configuration is set to prefer to use SMS over IP networks, and UE is not CS voice capable.

In one or more embodiments, when the end user device 110 is disabling the E-UTRA capability, it can do the following: select another RAT (GERAN or UTRAN) of the registered PLMN or equivalent PLMN; if an attempt to select another RAT does not succeed, then the end user device can perform PLMN selection—the end user device may re-enable the E-UTRA capability for this PLMN selection; or if no other allowed PLMN and RAT combinations are available, then the end user device may re-enable the E-UTRA capability and remain registered for EPS services in E-UTRAN of the registered PLMN. If the end user device 110 chooses this option, then it may periodically attempt to select another PLMN and RAT combination that can provide non-EPS services. In one embodiment, when an end user device 110 supporting the A/Gb and/or Iu mode together with the S1 mode needs to stay in A/Gb or Iu mode, in order to prevent unwanted handover or cell reselection from UTRAN/GERAN to E-UTRAN, the end user device can disable the E-UTRA capability. In conjunction with the E-UTRAN disabling, the end user device 110 can change the MS network capability IE in an ATTACH REQUEST message and the ROUTING AREA UPDATE REQUEST message after it selects GERAN or UTRAN if any capability bit is subject to change after disabling of the E-UTRA capability. In one or more embodiments, the end user device 110 can be limited to disabling the E-UTRA capability when in the EMM idle state. As an example, if the end user device 110 is required to disable the E-UTRA capability and select GERAN or UTRAN radio access technology, and the end user device is in the EMM connected state, the end user device can locally release the established NAS signaling connection and enter the EMM idle state before selecting GERAN or UTRAN radio access technology.

If the E-UTRA capability was disabled due to the end user device 110 initiating a detach procedure for EPS services only, upon request of the upper layers to re-attach for EPS services, the end user device can enable the E-UTRA capability again. As an implementation option, the end user device 110 may implement a timer for enabling E-UTRA as follows: if the attach attempt counter or tracking are updating attempt counter of the end user device 110 reaches 5, the end user device can start a timer when the end user device disables E-UTRA capability; on expiration of the timer, if no NAS signaling connection is established, the end user device can enable the E-UTRA capability; in Iu mode or A/Gb mode, if the RR connection is established when the timer expires, enabling E-UTRA capability can be delayed until the RR connection is released; and in Iu mode, on expiry of the timer, if the PS signaling connection is established, no RR connection is established, the end user device 110 may abort the PS signaling connection before enabling E-UTRA capability.

Figure 2:
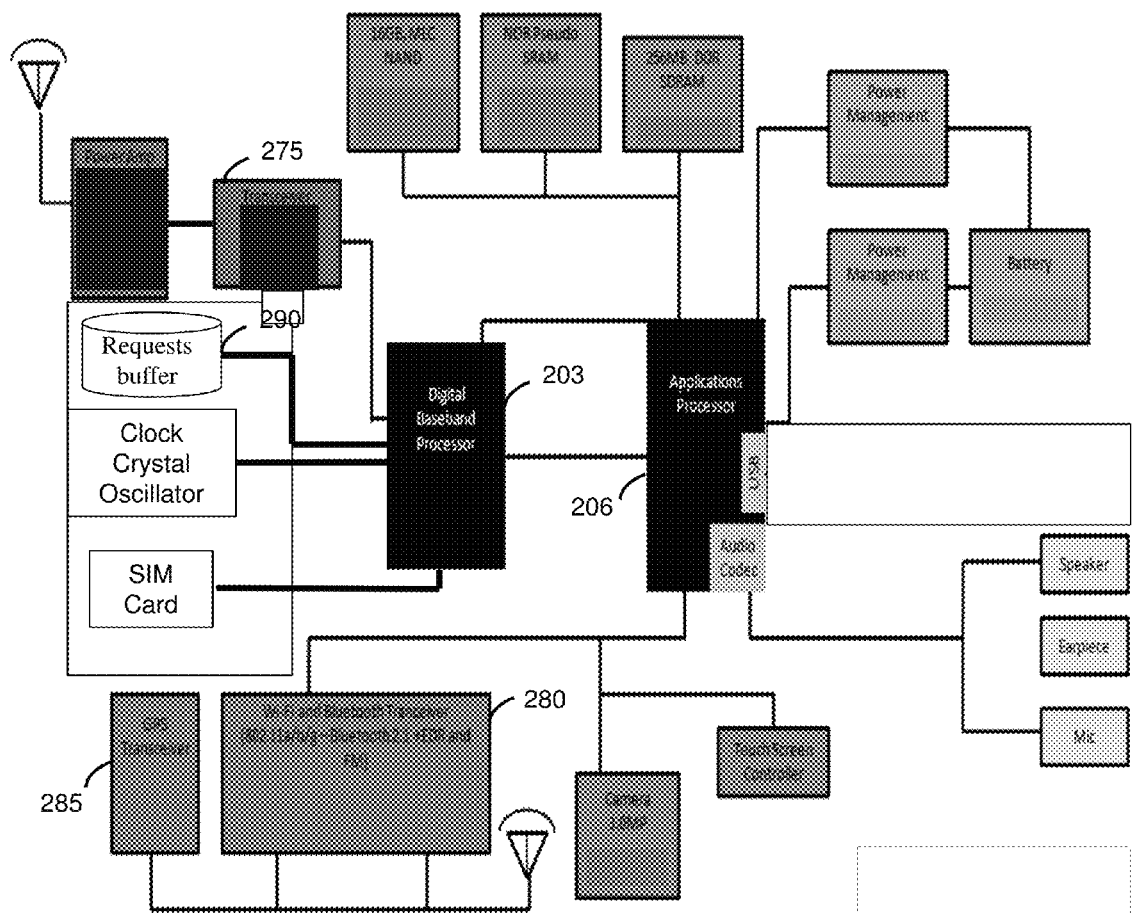
FIG. 2 depicts an illustrative embodiment of a communication device that is operable in the system of FIG. 1.

Referring to FIG. 2, a block diagram representing a wireless communication device 200 is illustrated. Device 200 includes a baseband processor 203 coupled with an applications processor 206 and a transceiver 275 that enable wireless communication to be transmitted and received via various communication protocols and networks, including the networks shown in FIG. 1 such as UTRAN 120, GERAN 130, and/or E-UTRAN 140. Communication device 200 can enter various operational states and sub-states, including the MM idle, GMM deregistered, GMM registered, EMM deregistered, EMM registered and/or E-UTRAN disabled states; and/or the attempting-to-update, attempting to attach sub-states of those corresponding states.

In one or more embodiments, the device 200 can implement one or more active timers (e.g., T3212, T3302, and/or T3402) associated with one or more of the states and/or sub-states. The baseband processor 203 can detect a target state and sub-state from among states and sub-states associated with the operation of the device 200. The baseband processor 200 can also detect an active timer from among potential timers executable by the device 200. In one or more embodiments, based on the detection, the device 200 can prevent (e.g., temporarily) a packet switching service initiation request from being transmitted, such as where the applications processor 206 generates the request. In one or more embodiments, the target state and sub-state and the active timer can be associated with execution of a first application by the applications processor 206 and the packet switching service initiation request that has been prevented from transmission, can be associated with execution of a second application by the applications processor 206. In one or more embodiments, procedures associated with the detected active timer can be permitted to continue to be executed despite the generation of other service initiation requests during the duration of the active timer. In one or more embodiments, the temporary preventing of the service initiation request may not affect communications being transmitted and/or received via transceiver 280 (e.g., a WiFi and/or Bluetooth transceiver) and/or transceiver 285 (e.g., a GPS transceiver).

In one or more embodiments, a buffer 290 can be utilized for temporarily storing one or more service initiation requests that have been prevented from transmission by the baseband processor 203. In one embodiment, the storage of the requests in the buffer 290 can be based on transmission instructions that are generated by the applications processor 206, such as instructions from the application being executed by the application processor that has generated the service initiation request. The transmission instructions can be generated in temporal proximity to the generation of the service initiation request and/or can be generated as a provisioned instruction which is stored by the broadband processor 203 in the event that a service initiation request generated by the particular application is to be temporarily prevented from transmission. In another embodiment, identified service initiation requests that are to be prevented from being transmitted, are discarded by the baseband processor 203.

Multiple forms of communication services can be enabled by the device 200 according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

In one or more embodiments, the baseband processor 203 can manage all of the long-distance radio functions, which may not include WiFi and/or Bluetooth communications. For example, the baseband processor 203 can utilize its own RAM and/or firmware. The baseband processor 203 due to the radio control functions (signal modulation, encoding, radio frequency shifting, etc.) can be highly timing dependent, and can utilize a real time operating system. In one embodiment, the baseband processor 203 can operate using an operating system that is distinct from an operating system of the applications processor 206.

Device 200 can include various other components that may or may not be illustrated in FIG. 2, including power amplifiers, antennas, memory, user interfaces, SIM card, clock oscillator, battery and so forth. The components of device 200 can be arranged in various configurations, including positioning the baseband processor 203 between the applications processor 206 and the transceiver 275 to facilitate the control exerted by the baseband processor to prevent (temporarily or otherwise) service initiation requests from being transmitted under select operational circumstances (e.g., target states, target sub-states, and/or target active timers).

Figure 3:
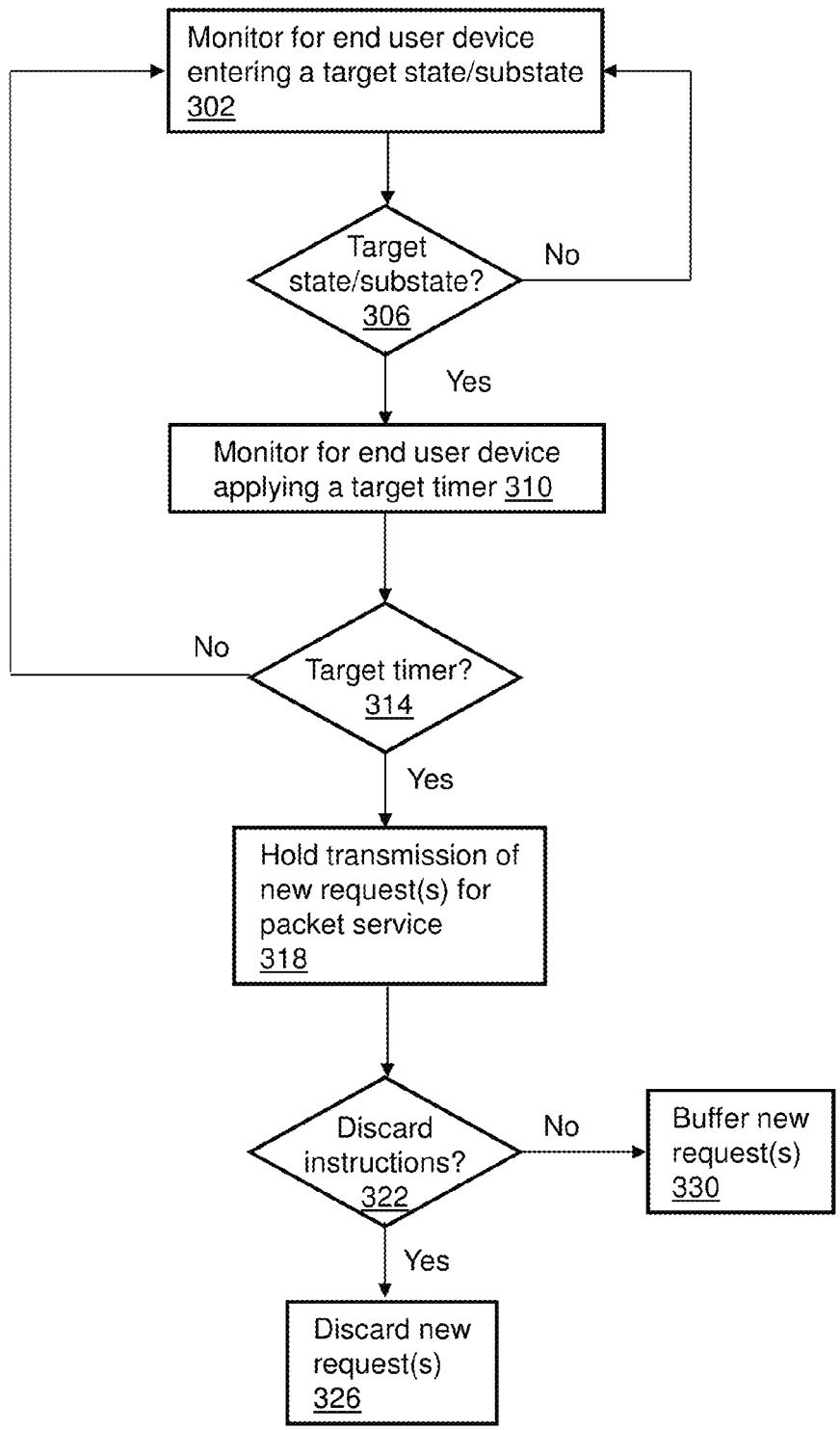
FIG. 3 depicts an illustrative embodiment of a method used in portions of the system described in FIG. 1 or by the device of FIG. 2.

FIG. 3 illustrates a method 300 for providing communication services. Method 300 is described with respect to end user device 110 but can be performed by one or more of the devices of system 100 and/or can be performed by device 200, as well as other communication devices. Method 300 can begin at 302 in which the end user device 110 monitors for entering a target state of operation and a target sub-state of operation. The end user device 110 can be configured for operation in a number of different states and a number of different sub-states, and the monitoring can include a detection (e.g., by the baseband processor 203) that the end user device has entered one of the target states and sub-states at 306.

The end user device 110 at 310 and 314 can monitor for and detect the end user device implementing a target timer, such as from among a group of timers. The active target timer can be associated with the target state and/or sub-state. The monitoring can include determining that an active timer is being implemented by the end user device 110 and further identifying that the active timer corresponds to a target timer from among a group of possible timers that the end user device can implement. Information describing target states, target sub-states and/or target timers can be stored in a memory of the end user device 110 and accessed by the end user device (e.g., via the baseband processor 203) for making these determinations and identification.

At 318, the end user device 110 (e.g., via the baseband processor 203) can process requests or data such that the target active timer and/or procedures associated with the target sub-state, the target state and/or the target active timer continue to be executed. As an example, a first application being executed by the applications processor 206 can generate a first packet switching services initiation request so that the first applications can participate in a communication session with another device of the network. In this example, a network issue may arise, such as congestion or network failure, which results in the end user device 110 entering one of the target states and sub-states (e.g., EMM idle state and attempting-to-update sub-state). Based on a detection of an active target timer (e.g., T3212 for the attempting-to-update sub-state of the EMM idle state), the baseband processor can hold transmissions of new service initiation requests, such as requests being generated by a second application executed at the applications processors. In this example, the second application may be attempting to establish its own communication session with the network and may be unaware of the state, sub-state and active timer associated with the services initiation request of the first application.

In one or more embodiments at 322, the end user device 110 can determine how to process a request or other data that is being held due to the detected active timer. If the end user device 110 identifies instructions to discard or otherwise dispose of the held request or other data then at 326 the discarding or disposal is performed. If on the other hand, the end user device 110 identifies instructions to delay the transmission of the held request or other data then the baseband processor can store the held request or data in a memory device at 330, such as a buffer. In this example, the end user device 110 can monitor for the expiration of the active target timer or some other triggering event in which the held request or data is permitted to be transmitted (e.g., a triggering event that causes the end user device to switch to a different operational state or sub-state such as receiving a message indicating a successful attempt-to-update or a successful attempt-to-attach), and can transmit the held request or other data based on the triggering event. In one or more embodiments, the instructions that determine how the end user device 110 will process the held request or other data can be provided by the application (being executed by the applications processor 206) such as in temporal proximity to the generating of the services initiation request or can be provisioned by the application at an earlier time so that the baseband processor 203 can access the instructions in the event that a target state, target sub-state, and/or target active timer is detected.

Figure 4:
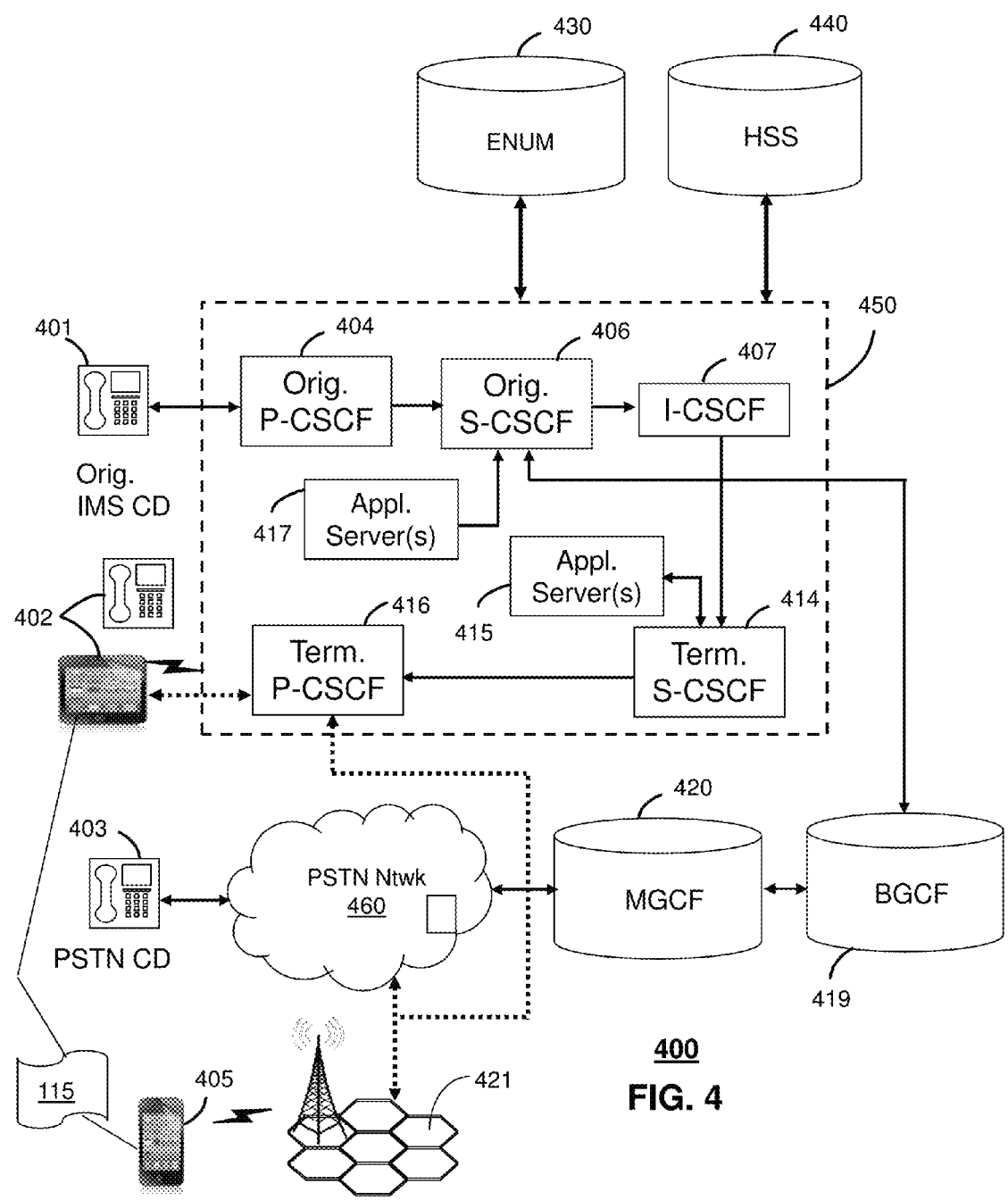
FIG. 4 depicts an illustrative embodiment of a communication system that provides communications services.

FIG. 4 depicts an illustrative embodiment of a communication system 400 employing an IP Multimedia Subsystem (IMS) network architecture to facilitate the combined services of circuit-switched and packet-switched systems. Communication system 400 can be overlaid or operably coupled with system 100 of FIG. 1 as another representative embodiment of communication system 100. System 400 enables end user devices to detect a packet-switching service initiation request and process the initiation request in a manner that allows selected currently running timers and/or selected procedures to be retained or otherwise completed. For example, in one embodiment the initiation request does not alter procedures and/or timers while there is an active timer and the end user device is in one or more of the following states/sub-states (as described by the 3GPP Specification): a MM idle state, an attempting-to-update sub-state of the MM idle state, a GMM deregistered state, an attempting-to-attach sub-state of the GMM deregistered state, a GMM registered state; an attempting-to-update state of the GMM deregistered sub-state, an EMM deregistered state, an attempting-to-attach state of the EMM deregistered state, an EMM registered state, an attempting-to-update state of the EMM registered state, and an E-UTRAN disabled state.

Communication system 400 can comprise a Home Subscriber Server (HSS) 440, a tElephone NUmber Mapping (ENUM) server 430, and other network elements of an IMS network 450. The IMS network 450 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the services of communication system 100 of FIG. 1.

If the terminating communication device is instead a PSTN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

Wireless CDs 402 and 405 can be adapted with software to perform management function 115 to managing requests and other data that are to be transmitted when a selected active timer and/or selected procedures (e.g., corresponding to a target sub-state and target state). As an example, function 115 enables detecting a packet-switching service initiation request and processing the initiation request in a manner that allows selected currently running timers and/or selected procedures to be retained or otherwise completed.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3GPP. It is further noted that some or all embodiments of the subject disclosure may in whole or in part modify, supplement, or otherwise supersede final or proposed standards published and promulgated by 3GPP.

Figure 5:
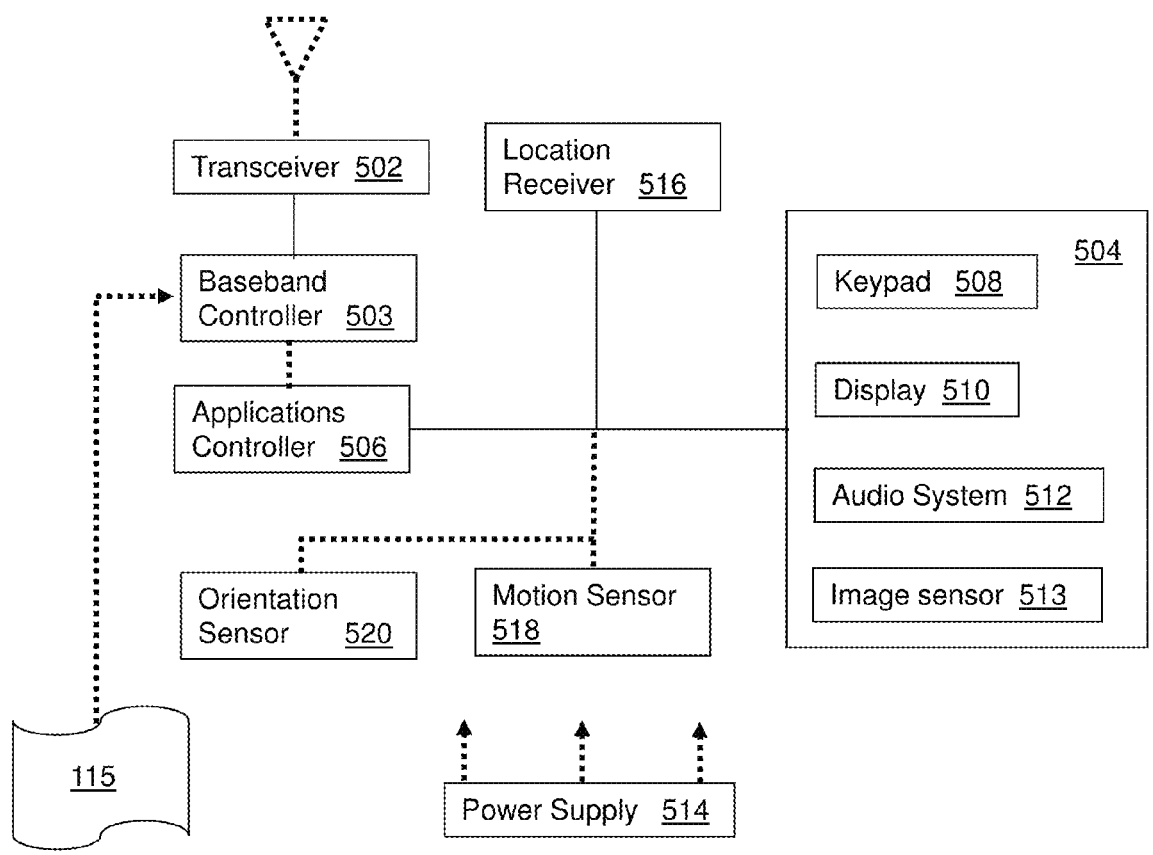
FIG. 5 depicts an illustrative embodiment of a communication device operable in the systems of FIGS. 1 and 4.

FIG. 5 depicts an illustrative embodiment of a communication device 500. Communication device 500 can serve in whole or in part as an illustrative embodiment of the devices depicted in FIGS. 1 and 4. Device 500 can operate in a number of different states and sub-states and can implement one or more active timers (e.g., T3212, T3302, and/or T3402) associated with one or more of the states and/or sub-states. Device 500 can detect a target state and sub-state from among the states and sub-states, and can also detect an active timer from among potential timers executable by the device. In one or more embodiments, based on the detection, the device 500 can prevent (e.g., temporarily) a packet switching service initiation request or other data from being transmitted, such as where the applications controller 506 generates the request and the baseband controller 503 performs the detection and the transmission prevention. In one or more embodiments, the target state and sub-state and the active timer can be associated with execution of a first application by the applications controller 506 and the packet switching service initiation request that has been prevented from transmission, can be associated with execution of a second application by the applications controller 506. In one or more embodiments, procedures associated with the detected active timer can be permitted to continue to be executed despite the generation of other service initiation requests during the duration of the active timer.

To enable these features, communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of the communication devices of FIG. 1, as well as the IMS CDs 501-502 and PSTN CDs 503-505 of FIG. 5. It will be appreciated that the communication device 500 can also represent other devices that can operate in communication systems 100 and 400 of FIGS. 1 and 4 such as a wireless gaming console or a wireless media player.

The communication device 500 (such as via baseband controller 503 can be adapted in various embodiments to perform the functions 115 described with respect to FIG. 1.

Upon reviewing the aforementioned embodiments, it would be evident to an artisan with ordinary skill in the art that said embodiments can be modified, reduced, or enhanced without departing from the scope of the claims described below. For example, other states, sub-states and active timers or combinations thereof can be triggering events that cause the end user device to delay or discard subsequent transmission requests. In one or more embodiments, a subsequent services initiation request that is detected by the end user device 110 during a target active timer can cause the end user device to adjust the active timer (e.g., shorten and/or lengthen the time period of the timer) and/or adjust procedures associated with the active timer (and/or associated with the target sub-state/state). In this embodiment, the adjustments to the active timers and/or the procedures can be based on instructions generated by an application that generated the initial services request. In one or more embodiments, the functions 115 can have no effect on communications from or to the end user device 110 that are in the circuit switching domain. In one or more embodiments, the service initiation request that is being held or delayed is generated by an application without user input, such as automatic updates or tweets. In one or more embodiments, the end user device 110, upon detection of a target state, a target sub-state and/or a target active timer can enable any one or more functions described above to continue, including incrementing counters, transmitting request messages, and so forth. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
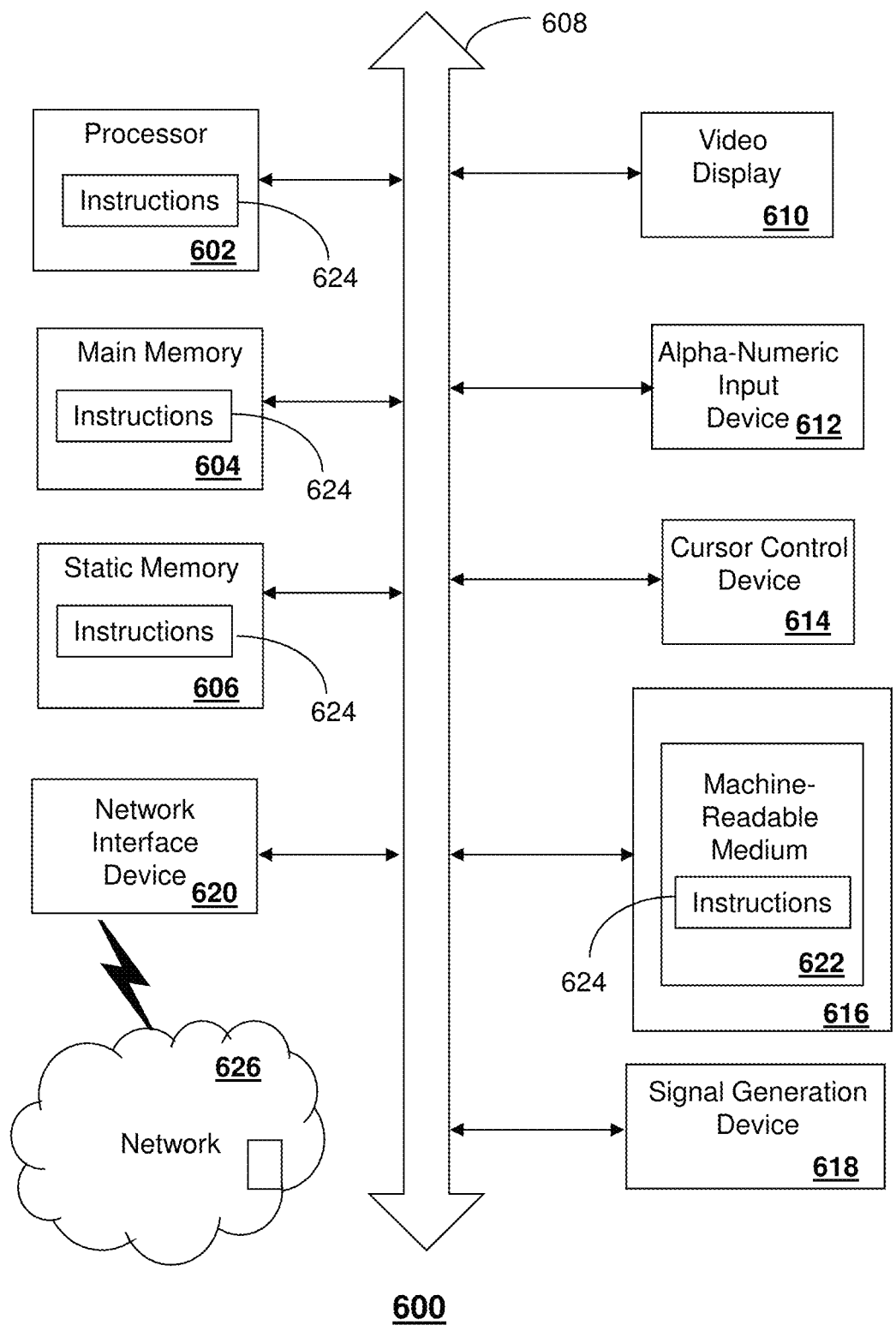
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. For example, system 600 can enable end user devices to detect a packet-switching service initiation request and process the initiation request in a manner that allows selected currently running timers and/or selected procedures to be retained or otherwise completed. One or more instances of the machine can operate, for example, as the end user device 110, the communication device 500 and other devices of FIGS. 1-5. In some embodiments, the machine may be connected (e.g., using network 626) to other machines. In a networked deployment, the machine may operate as a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display. The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A machine-readable storage device comprising instructions, which, responsive to being executed by a processing system including a baseband processor of a cellular phone that facilitates communications with a stationary base station, cause the processing system to perform operations comprising:
   responsive to a determination that a first communication session is in a first sub-state, monitoring for an active timer associated with the first sub-state, wherein the active timer was commenced by the cellular phone according to a wireless communications protocol, and wherein the first communication session is in the first sub-state due to network congestion;
   determining how to process held packet switching service initiation requests; and
   preventing, by the baseband processor, a packet switching service initiation request associated with a second communication session from being transmitted during a duration of the active timer by a transceiver of the cellular phone to obtain a held packet switching service initiation request associated with the second communication session; and
   processing the held packet switching service initiation request associated with the second communication session based on the determining of how to process the held packet switching service initiation requests,
   wherein the packet switching service initiation request for the second communication session is generated by an applications processor of the cellular phone,
   wherein the monitoring for the active timer associated with the first sub-state includes monitoring for a first active timer among a group of active timers that are associated with the first sub-state,
   wherein the preventing of the packet switching service initiation request from being transmitted is responsive to a detection of the packet switching service initiation request.

2. The machine-readable storage device of claim 1, wherein the operations further comprise:
   storing the packet switching service initiation request in a buffer of the cellular phone; and
   responsive to an expiration of the first active timer and a determination that the first communication session is in a second sub-state defined by the wireless communications protocol, transmitting the packet switching service initiation request via the transceiver.

3. The machine-readable storage device of claim 1, wherein the wireless communications protocol is based on a 3rd generation partnership project technical specification and wherein the operations further comprise:
   monitoring for the first communication session being in a first state defined by the wireless communications protocol;
   responsive to a determination that the first communication session is in the first state, monitoring for the first communication session being in the first sub-state defined by the wireless communications protocol; and
   responsive to a detection of the active timer, monitoring for the packet switching service initiation request for the second communication session.

4. The machine-readable storage device of claim 3, wherein the first state corresponds to a mobility management idle state.

5. The machine-readable storage device of claim 4, wherein the first sub-state corresponds to an attempting-to-update sub-state.

6. The machine-readable storage device of claim 3, wherein the first state corresponds to a general packet radio service mobility management deregistered state.

7. The machine-readable storage device of claim 6, wherein the first sub-state corresponds to an attempting-to-attach sub-state.

8. The machine-readable storage device of claim 3, wherein the first state corresponds to a general packet radio service mobility management registered state.

9. The machine-readable storage device of claim 8, wherein the first sub-state corresponds to an attempting-to-update sub-state.

10. The machine-readable storage device of claim 3, wherein the first state corresponds to an evolved packet system mobility management deregistered state.

11. The machine-readable storage device of claim 10, wherein the first sub-state corresponds to an attempting-to-attach sub-state.

12. The machine-readable storage device of claim 3, wherein the first state corresponds to an evolved packet system mobility management registered state.

13. The machine-readable storage device of claim 12, wherein the first sub-state corresponds to an attempting-to-update sub-state.

14. The machine-readable storage device of claim 3, wherein the first state corresponds to an E-UTRAN disabled state.

15. The machine-readable storage device of claim 1, wherein the processing of the held packet switching service initiation request associated with the second communication session comprises discarding, by the baseband processor, the packet switching service initiation request associated with the second communication session.

16. A method comprising:
responsive to a determination that a first communication session is in a first sub-state, monitoring, by a processing system including a processor of a cellular phone that facilitates communications with a stationary base station, for an active timer associated with the first sub-state that was commenced by the cellular phone, wherein the first communication session is in the first sub-state due to network congestion;
responsive to a detection of the active timer, monitoring, by the processing system, for a packet switching service initiation request associated with a second communication session being generated by the cellular phone;
determining, by the processing system, how to process a delayed packet switching service initiation request;
delaying, by the processing system, the packet switching service initiation request associated with the second communication session from being transmitted by a transceiver of the cellular phone to obtain a delayed packet switching service initiation request associated with the second communication session; and
processing the delayed packet switching service initiation request associated with the second communication session based on the determining of how to process the delayed packet switching service initiation request.

17. The method of claim 16, comprising:
monitoring, by the processing system, for the first communication session being in a first state and the first sub-state, wherein the first state and the first sub-state are defined by a communications protocol, and wherein the first sub-state is associated with the first state,
wherein the processing of the delayed packet switching service initiation request comprises temporarily preventing transmitting the delayed packet switching service initiation request over a time period comprising a duration of the active timer.

18. The method of claim 16, monitoring, by the processing system, for the first communication session being in a first state and the first sub-state, wherein the first state and the first sub-state are defined by a communications protocol, and wherein the first sub-state is associated with the first state, wherein the communications protocol is based on a 3rd generation partnership project technical specification, wherein the processor corresponds to a baseband processor, wherein the packet switching service initiation request is generated by an applications processor of the cellular phone, and further comprising:
storing, by the processing system, the packet switching service initiation request according to processing instructions associated with an application that generated the packet switching service initiation request,
wherein the processing of the delayed packet switching service initiation request comprises discarding the delayed packet switching service initiation request.

19. A cellular phone, comprising:
a memory that stores instructions;
an applications processor coupled to the memory;
a transceiver; and
a processing system including a processor coupled to the transceiver, the memory and the applications processor,
wherein the processing system, responsive to executing the instructions, performs operations comprising:
responsive to a determination that a first communication session is in a first sub-state, monitoring for an active timer associated with the first sub-state that was initiated by the cellular phone, wherein the first communication session is in the first sub-state due to network congestion;
determining how to process a delayed packet switching service initiation request;
delaying a packet switching service initiation request generated by the applications processor from being transmitted by the transceiver responsive to a detection of the active timer to obtain a delayed packet switching service initiation request, wherein the packet switching service initiation request is for initiating a second communication session;
storing the delayed packet switching service initiation request; and
processing the delayed packet switching service initiation request based on the determining of how to process the delayed packet switching service initiation request.

20. The cellular phone of claim 19, wherein the operations further comprise monitoring for the packet switching service initiation request generated by the applications processor, wherein the first sub-state is defined by a communications protocol, wherein the active timer was commenced according to the communications protocol, wherein the delaying is over a time period comprising a duration of the active timer.

* * * * *